United States Patent [19]

Moore

[11] Patent Number: 4,792,063
[45] Date of Patent: Dec. 20, 1988

[54] FOLLOWER PLATE ASSEMBLY

[75] Inventor: Leo M. Moore, Chesterfield, Va.

[73] Assignee: Industrial Machine Manufacturing, Inc., Richmond, Va.

[21] Appl. No.: 134,743

[22] Filed: Dec. 18, 1987

[51] Int. Cl.$^4$ .............................. B67D 5/62
[52] U.S. Cl. ............................... 222/146.5; 222/261; 222/386; 222/389; 126/343.5 A; 219/421
[58] Field of Search .............. 222/146.2, 146.4, 146.5, 222/256, 259–262, 386, 389; 219/420–424, 316; 126/343.5 R, 343.5 A; 432/13, 210

[56] References Cited

U.S. PATENT DOCUMENTS

| 1,752,537 | 4/1930 | Moulton | 222/389 X |
|---|---|---|---|
| 3,282,469 | 11/1966 | Skonberg | 222/146 |
| 3,412,903 | 11/1968 | Van Riper, Jr. et al. | 222/146 |
| 3,555,734 | 11/1982 | Moore | 222/63 |
| 3,637,111 | 1/1972 | McCreary | 222/146 H |
| 3,758,003 | 9/1973 | Kautz et al. | 222/146 R |
| 3,976,229 | 8/1976 | Jackson | 222/146 HE |
| 3,982,669 | 9/1976 | Jager | 241/14 |
| 4,073,409 | 2/1978 | Gardner et al. | 222/146 HE |
| 4,195,755 | 4/1980 | Slautterback et al. | 222/146 HE |
| 4,227,069 | 10/1980 | Gardner et al. | 219/421 |
| 4,240,567 | 12/1980 | Gardner | 222/146 HE |
| 4,270,674 | 6/1981 | Moore | 222/146 HE |
| 4,344,547 | 8/1982 | Moore | 146 HE/4,355,734 |
| 4,534,493 | 8/1985 | Sedran | 222/146.2 |
| 4,592,491 | 6/1986 | Chollet | 222/146.5 |
| 4,632,281 | 12/1985 | Wold | 222/389 |
| 4,635,820 | 1/1987 | Marshall | 222/63 |
| 4,661,688 | 4/1987 | Gabryszewski | 219/421 |

FOREIGN PATENT DOCUMENTS 1048178 12/1958 Fed. Rep. of Germany ...... 222/386

Primary Examiner—Charles A. Marmor
Attorney, Agent, or Firm—Witherspoon & Hargest

[57] ABSTRACT

A follower plate assembly for dispensing hot melt material from a drum-like container including a bottom plate which is heated, a top plate spaced from the bottom plate, and a cylindrical member positioned between the top and bottom plates. The cylindrical member includes seals which engage the inside wall of the container from which material is to be dispensed. A plurality of metallic slip rings serve to seal the interface between the bottom plate and the cylindrical member.

17 Claims, 3 Drawing Sheets

FOLLOWER PLATE ASSEMBLY

BACKGROUND OF THE INVENTION

1. Field of the Invention

The invention relates to dispensing materials from a container using apparatus including a follower plate assembly which is lowered into the container housing the material to be dispensed. The follower plate assembly includes a base plate which is heated to melt the material and a separate cylindrical member which includes sealing means for use in preventing leakage of such material at the interface of the base plate and the inner wall or surface of the container as the follower plate assembly is being lowered into the container in a known manner. Sealing means are also provided which prevent leakage between the interface of the base plate and separate cylindrical member while facilitating expansion of the base plate relative to the cylindrical member and preventing undesirable heat transfer to the cylindrical member as the temperature of the base plate is increased during operation of the follower plate assembly.

2. Description of the Prior Art

The viscosity of materials to be dispensed using apparatus of the present invention varies depending upon the specific application, and it is not unusual to find materials which are not particularly viscous and are substantially free flowing. On the other hand in certain applications such materials may be viscous to the extent to require the application of heat and/or pressure in order to render such materials dispensable. The present invention is applicable to apparatus for dispensing those materials which require the use of heat and pressure for adequate dispensing.

In one form of apparatus of the type contemplated by the present invention a plate is caused to reciprocate into and out of the open end of a drum-like container housing the material to be dispensed. Examples of such a plate are disclosed in Moore, U.S. Pat. Nos. 4,270,674 and 4,344,547. In operation, as the plate enters the drum it engages the inside surface of the drum and the material therein. As the plate travels towards the closed base of the drum it causes the material sandwiched or pressured therebetween to be dispensed, as for example, by forcing the material through an opening in the plate. Such dispensing may be facilitated by means of a pump associated with such opening to pump the material therethrough as the plate is lowered into the drum. The dispensing operation is further facilitated by applying heat to the material within the drum. This may be accomplished by, for example, utilizing a plate which includes a heating element affixed thereto or disposed internal thereof. The dispensing of highly viscous material usually requires the combination of such heat, pressure and pumping action to adequately dispense the material. Examples of a dispensing apparatus which may rely upon heat, pressure and pumping are disclosed in Moore, U.S. Pat. Nos. 3,982,699 and 4,355,734.

As the plate is lowered into the drum and engages the material, there is a tendency for the material to flow from the bottom of the plate over the top of the plate at the peripheral surface or edge thereof where the plate is adjacent to the inside surface of the drum. For example, in those instances where the plate is cylindrical and is caused to extend into a cylindrical drum for purposes of dispensing material from within the drum, there is a tendency for the material to flow or leak between the outer periphery of the cylindrical plate and the inside surface of the drum. In order to prevent such leakage and to direct substantially all of the material through the dispensing opening in the plate, sealing means or wipers have been used. For example, the cylindrical plate discussed above may be encircled with one of more resilient sealing means which serve to scrape the inside surface of the drum and also to prevent or reduce leakage at the interface between the inside surface of the drum and the periphery of the plate. Such wipers generally are O-ring-like resilient seals, either solid or inflated, which are fastened to the end of the plate and caused to seat in an associated groove which extends about the peripheral surface of the plate. Examples of such wipers are disclosed in U.S. Pat. Nos. 3,282,469; 3,412,903; 3,637,111; 3,758,003; 3,976,229; 4,073,409; 4,227,069; 4,195,755; 4,240,567; 4,534,493; 4,592,491; 4,635,820; and, 4,661,688.

In operation of such apparatus the follower plate is heated to as high as 500 degrees F. or more in order to melt the material to be dispensed. As the temperature of the follower plate is increased there is a tendency for it to expand. Such expansion tends to press the resilient seals against the inside wall of the container from which material is being dispensed. The result is that the seals tend to abrade or otherwise prematurely fail. In addition, there is a tendency for the follower plate to be bound within the container. When using a fiber drum, fiber drum liner or the like there is also the tendency for such expansion to damage the liner or drum. In addition, seals which are coupled directly to the follower plate are subjected to thermal degradation resulting from such high temperatures. Although it is desirable that the seals which engage the inside wall of the container and the material adhering thereto reach a temperature adequate to prevent the material from solidifying in the vicinity of such seals, it is undesirable for the seals to reach the excessive temperatures reached by the follower plate per se. It is possible to mount the seals upon a member which is separate from but coupled to the follower plate. However, heat transfer from the follower plate to such separate member will still cause thermal degradation of the seals. In addition, as the temperature of such separate member increases, it will expand causing the same problems discussed above caused by forcing the seals against the inside wall of the container as the follower plate per se expands. Further, when melting highly viscous material, it is often desirable to cause the follower plate to bear against the surface of the material with a great degree of pressure to facilitate dispensing. In those instances where the seals are attached to a separate member there will be a tendency for the molten material to leak at the interface between such separate member and the follower plate due to the combination of high pressure and high temperature to which the material is subjected. Such leakage may cause the molten material to flow into the area above the follower plate where electrical components used in the heating of the follower plate are housed. Such leakage is obviously undesirable. Leakage could be reduced, if not eliminated, by reducing the pressure exerted by the follower plate against the material to be dispensed. However, this will reduce the rate of flow of the material during the dispensing operation. In addition, the interface between the follower plate and separate member will tend to provide a path for oxygen to pass into the container thereby exposing the material to undesirable oxidation. Any attempt to seal the interface must deal with temperatures as high as 500 degrees F. or more, pressures of the material being dispensed of up to 100 pounds per square inch or more, and the expansion of the follower plate. This presents a dilemma in that such high temperature and expansion of the follower plate will tend to degrade elastomeric seals. On the other hand, a metal-to-metal seal might require pressure between the separate member and the follower plate in the order of magnitude of up to 3000 pounds per square inch or more. Such excessive pressure will impede movement of the follower plate relative to the separate member during thermal expansion of the follower plate.

It is highly desirable to provide a follower plate assembly wherein expansion of a heating plate as temperature of the plate increases does not cause damages to the resilient wipers.

It is also desirable to provide a follower plate assembly wherein expansion of a heating plate as temperature of the plate increases does not damage the drum or drum liner from which material is to be dispensed.

It is desirable to provide a follower plate assembly wherein expansion of a heating plate as temperature of the plate increases does not cause the assembly to become bound within the container from which material is to be dispensed.

It is further desirable to provide a follower plate assembly wherein increasing the temperature of a heating plate does not damage the resilient wipers of the assembly.

It is further desirable to provide a follower plate assembly wherein increasing the temperature of a heating plate provides adequate heat transfer to heat the resilient wipers of the assembly to an extent to prevent the material being melted from solidifying in the vicinity of the wipers without thermal degradation of the wipers.

It is also desirable to provide a follower plate assembly including a heating plate and separate member for carrying the wiper(s) wherein the material to be melted can be subjected to high pressure and temperature without substantial leakage at the heating plate-separate member interface.

It is further desirable to provide a follower plate assembly including a heating plate and separate member for carrying the wiper(s) wherein the material to be melted can be subjected to high pressure and temperature without leakage of oxygen into the container from which material is being dispensed.

It is further desirable to provide a follower plate assembly including a heating plate and separate member for carrying the wiper(s) wherein the material to be melted can be subjected to high pressure and temperature without impeding movement of the heating plate, caused by thermal expansion of the heating plate, relative to the separate member.

SUMMARY OF THE INVENTION

This invention achieves these and other results by providing a follower plate assembly shaped to fit inside a container having an inner wall comprising a bottom plate including an upper boundary surface and a lower boundary surface and having at least one aperture therethrough. The bottom plate includes means associated therewith useful in providing for heating the bottom plate when the follower plate assembly is in operation. At least one top plate is provided spaced from the bottom plate and having an upper boundary and a lower boundary. The top plate includes a outer peripheral portion. A cylindrical member is provided having an outer surface, an inner surface, and upper surface, and a lower surface, the cylindrical member being positioned between the bottom plate and the top plate such that the upper surface is adjacent the lower boundary and the lower surface is adjacent but not in contact with the upper boundary surface to form a cavity formed by the bottom plate, the top plate, and the cylindrical member. The cylindrical member includes means engaging the outer surface for sealing an interface between the inner wall of the container and the outer surface of the cylindrical member when the follower plate assembly is inserted into the container. Means engaging the upper surface and the lower boundary are provided to form first means for sealing the cavity at an interface between the cylindrical member and the top plate. Means positioned between the lower surface and the upper boundary surface are provided to form second means for sealing the cavity at an interface between the cylindrical member and the bottom plate. Means are also provided for engaging the top plate and the bottom plate for urging the top plate towards the bottom plate to actuate the first means and the second means.

DESCRIPTION OF THE PREFERRED EMBODIMENT

Figure 1:
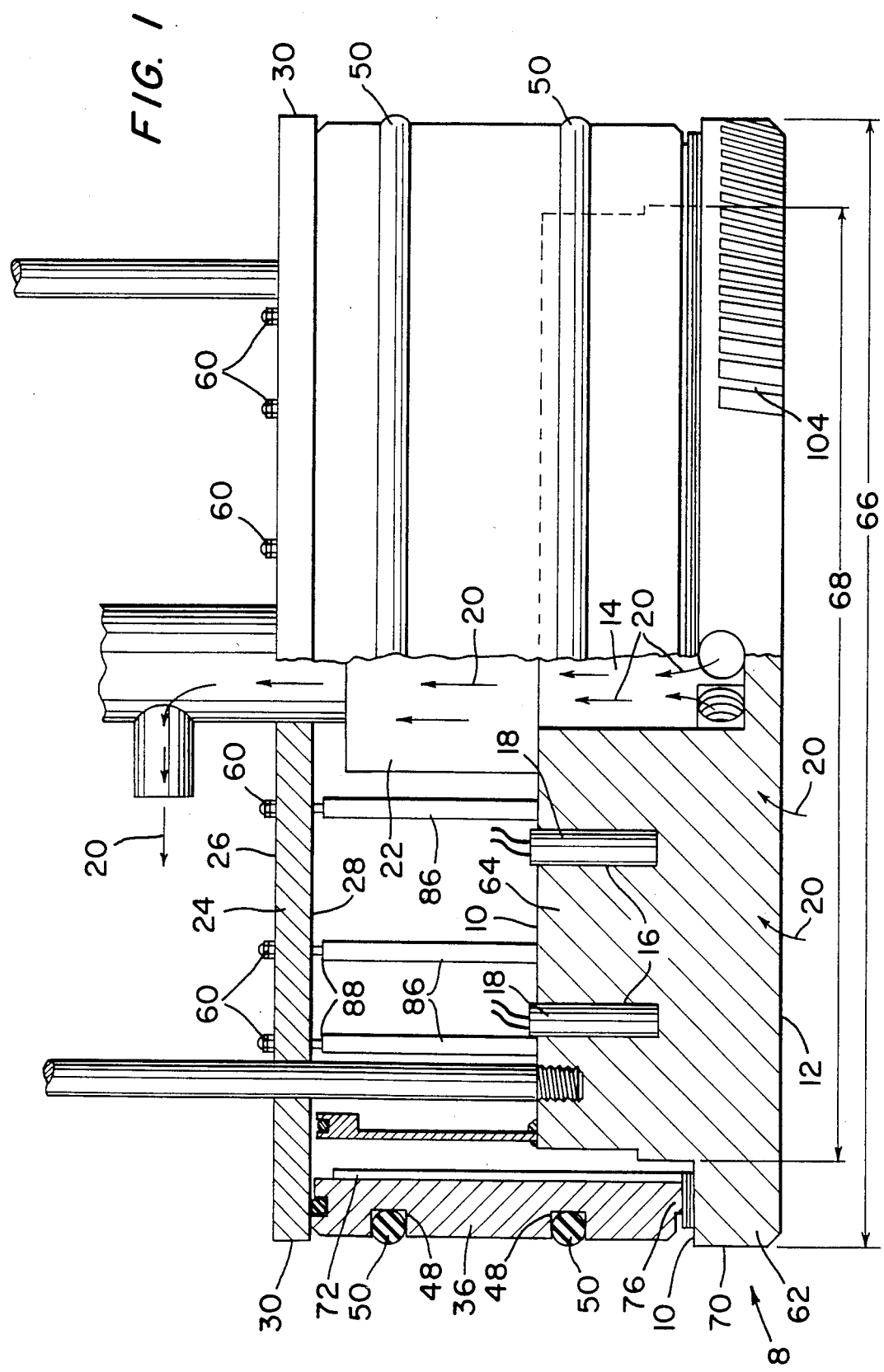
FIG. 1 is an elevational view partially in cross section of one embodiment of the follower plate assembly of the present invention prior to preloading by means of the draw members.
Figure 2:
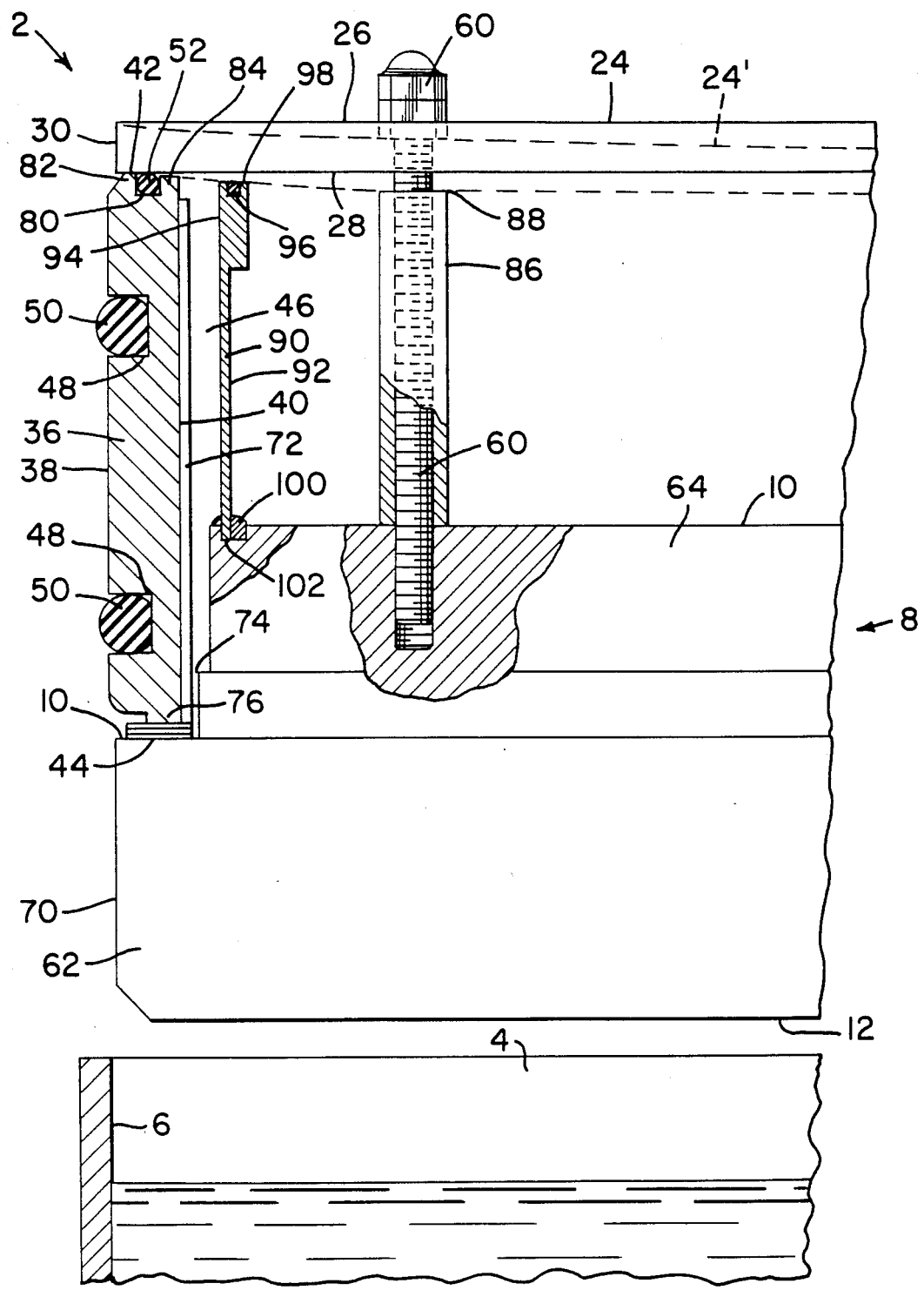
FIG. 2 is an enlarged view of a portion of the follower plate assembly of FIG. 1.

The embodiment of this invention which is illustrated in the drawings is particularly suited for achieving the objects of this invention. FIGS. 1 and 2 depicts a follower plate assembly 2 of the type shaped to fit inside a container 4 having an inner wall 6. The follower plate assembly 2 includes a bottom plate 8 including an upper boundary surface 10 and a lower boundary surface 12. Although not necessary, bottom plate 8 is generally cylindrical. Bottom plate 8 has at least one aperture 14 therethrough through which melted material is dispensed from container 4. Means are associated with the bottom plate useful in providing for heating the bottom plate when the follower plate assembly is in operation. For example, bottom plate 8 includes a plurality of apertures 16 into each of which is inserted a cartridge heater 18 for purposes of heating the bottom plate 8 to thereby soften the material to be dispensed. Such a heater-follower plate is known in the art and is described in the Moore patent, U.S. Pat. No. 3,982,669. Means are also provided for causing the melted material to flow through aperture 14 in a direction, indicated by arrows 20. Such means may include a pump 22 coupled with bottom plate 8 which pumps material through aperture 14 in the direction shown by arrows 20. Means are also provided which are coupled with the follower plate assembly for causing the assembly to move vertically relative to a container such that the plate may be caused to move into or out of the container as desired. For example, hydraulically or pneumatically operated telescoping rods of the type described in U.S. Pat. No. 3,982,669 may be used to move the follower plate assembly. In the preferred embodiment, the bottom plate 8 is machined from a single piece of metal such as, for example, aluminum.

At least one top plate 24 is provided spaced from bottom plate 8 and having an upper boundary 26 and a lower boundary 28. The top plate 24 also includes an outer peripheral portion 30. Although not necessary, in the preferred embodiment top plate 24 includes two semi-circular plates 32 and 34.

A cylindrical member 36 is included, the cylindrical member including an outer surface 38, an inner surface 40, an upper surface 42 and a lower surface 44. Cylindrical member 36 is positioned between bottom plate 8 and top plate 24 such that upper surface 42 is adjacent lower boundary 28 and lower surface 44 is adjacent, but not in contact with, upper boundary surface 10, to form a cavity 46 formed by bottom plate 8, top plate 24 and cylindrical member 36. The cylindrical member 36 includes means engaging the outer surface 38 for sealing an interface between inner wall 6 of the container 4 and outer surface 38 of the cylindrical member when the follower plate assembly is inserted into container 4. For example, the engaging means can include one or more channels 48 extending about outer surface 38 and including a resilient sealing member 50 positioned in a respective channel 48 for engagement with inner wall 6 during the melting operation.

Means are also provided engaging upper surface 42 and lower boundary 28 to form first means for sealing cavity 46 at an interface between the cylindrical member 36 and the top plate 24. For example, in the embodiment depicted in the drawings, a resilient sealing member 52 is provided as described hereinafter in further detail. Sealing members 50 and 52 can be an elastomer such as, for example, a known silicone sealing material.

Means are provided positioned between lower surface 44 and upper boundary surface 10 to form second means for sealing the cavity 46 at an interface between the cylindrical member 36 and bottom plate 8. For example, in the preferred embodiment the second means includes a plurality of stacked metallic rings such as rings 54, 56 and 58, each of which extend about the periphery of the bottom plate 8. Although more or less than the three rings 54, 56, and 58 can be used, in each embodiment the plurality of rings will include an uppermost slip ring, such as slip ring 54, which engages the lower surface 44 of cylindrical member 36, and a lowermost slip ring 58, which engages the upper boundary surface 10 of the bottom plate 8 as described hereinafter in further detail. In the preferred embodiment at least ring 58 is a hardened metal such as hardened stainless steel and should be a metal different than that of bottom plate 8. For example, it is preferred that slip ring 58 be hardened stainless steel and bottom plate 8 be aluminum. In this manner, the functioning of the slip rings as described below is facilitated. In a preferred embodiment, slip ring 58 can be hardened stainless steel and slip rings 54 and 56 can be softened stainless steel.

Means are also provided engaging top plate 24 and bottom plate 8 for urging the top plate towards the bottom plate to actuate the first sealing means and the second sealing means. For example, such urging means is depicted as including a plurality of draw members 60 which extend from bottom plate 8 to top plate 24, draw members 60 being threaded into bottom plate 8 as depicted in FIG. 2. Preferably, the draw members 60 are in the form of tie rods or the like one end of each of which has been threaded into bottom plate 8. Each tie rod extends through corresponding apertures in top plate 24. In such embodiment nuts are threaded upon the other end of each tie rod. As such nuts are tightened they are subjected to sufficient torque to preload the tie rods causing top plate 24 to be bowed towards bottom plate 8 as depicted in phantom in FIG. 2. Alternatively, the draw members can be in the form of drawbolts which are threadedly tightened into bottom plate 8, such drawbolts being subjected to sufficient torque to preload the drawbolts causing top plate 24 to be bowed towards bottom plate 8 as depicted in phantom lines at 24' in FIG. 2. Regardless of the form of draw members used, by preloading the draw members the outer peripheral portion 30 of the top plate is caused to exert a force against top surface 42 of the cylindrical member 36 so that lower surface 44 is caused to exert a force against uppermost slip ring 54 to actuate the seal which the slip rings 54, 56 and 58 provide at the interface between the cylindrical member and the bottom plate.

In the preferred embodiment bottom plate 8 is generally cylindrical and includes a first portion 62 which includes the lower boundary surface 12 and a second portion 64 which includes an uppermost portion of the upper boundary surface 10. First portion 62 and second portion 64 have relative dimensions wherein the dimension 66 of first portion 62 is greater than the dimension 68 of second portion 64 such that the first portion 62 forms a first peripheral flange 70 which includes a lowermost portion of upper boundary surface 10. In the preferred embodiment, such dimensions 66 and 68 represent the diameter of the cylindrical-type bottom plate 8 as depicted in the drawings. In this manner, in the preferred embodiment the lower surface 44 of the cylindrical member 36 is adjacent the first peripheral flange 70.

Figure 3:
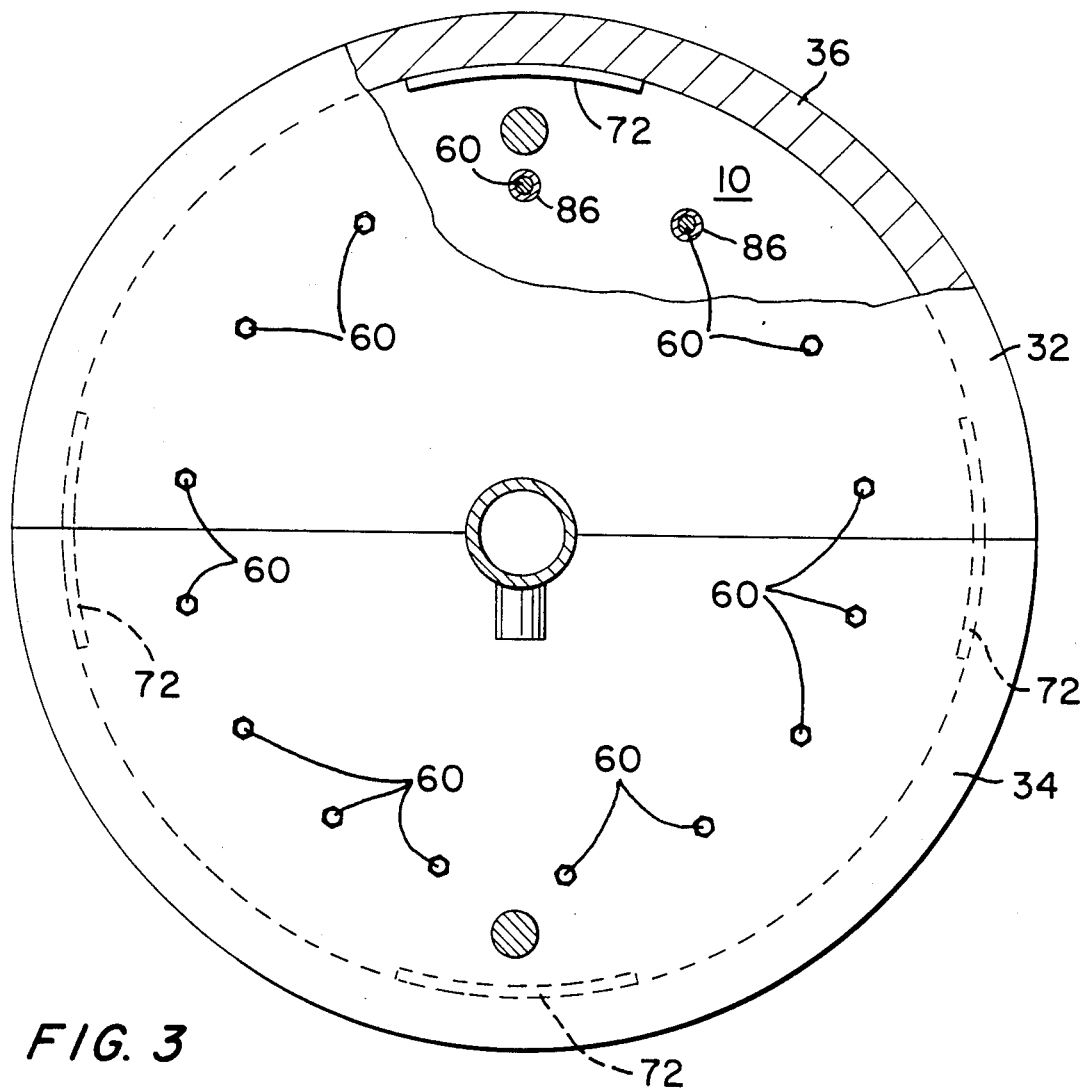
FIG. 3 is a plan view of the follower plate assembly of FIG. 1.

The follower plate assembly 2 also preferably includes at least one insulating gasket 72 positioned between inner surface 40 and the first portion 64 of the bottom plate 10. A space 74 is provided between the gasket 72 and bottom plate 10. Preferably there are four sections of gasket 72, spaced at 90 degrees as depicted in FIG. 3. A preferred material is a high temperature-pressure resistant resilient gasket material.

The drawings depict lower surface 44 of cylindrical member 36 as including a second peripheral flange 76 which is adjacent the first peripheral flange 70 at the lowermost portion of upper boundary surface 10. In the preferred embodiment, the second peripheral flange 76 is sized to minimize heat transfer between bottom plate 8 and cylindrical member 36. For example, the width of flange 76 as identified at 78 could be as narrow as one quarter inch, or even narrower providing flange 76 is wide enough to withstand the pressure to which it will be subjected when the follower plate assembly is in operation.

Upper surface 42 of the cylindrical member 36 includes a peripheral groove 80 having an outer shoulder 82 and an inner shoulder 84. The outer shoulder 82 engages the lower boundary 28, and the inner shoulder 84 is spaced from the lower boundary 28, as depicted in solid lines in FIG. 2, before the plurality of draw members 60 are subjected to sufficient torque to be preloaded. When the draw members 60 have been subjected to sufficient torque to be pre-loaded, the affect will be to cause the top plate 24 to be deflected downward, as depicted in phantom lines 24' in FIG. 2, such that the outer shoulder 82 and inner shoulder 84 both engage the lower boundary 28. As depicted in FIG. 2, the sealing member 52 is positioned in the peripheral groove 80.

In the embodiment depicted in the drawings a plurality of tubular standoffs 86 is provided. Each tubular standoff 86 extends from lower boundary 28 to upper boundary surface 10 and has a respective draw members 60 inserted therethrough. In order to adequately provide for the deflection of top plate 24, the end 88 of each tubular standoff nearest the lower boundary 28 is spaced further from the lower boundary 28 than is the inner shoulder 84 before the draw members are pre-loaded. In this manner, preloading of the draw members will cause the top plate 24 to be deflected downward so that each end 88 of each standoff 86 will engage the lower boundary 28 when the draw members have been pre-loaded, as depicted in phantom lines 24' in FIG. 2.

Follower plate assembly 2 also includes a guard 90 spaced from inner surface 40 of cylindrical member 36. Guard 90 is cylindrical, extending from upper boundary surface 10 to lower boundary 28 about the top plate and bottom plate to form a housing bounded by an inside surface 92 of the guard, the lower boundary 28 of the top plate 24, and the upper boundary surface 10 of the bottom plate 8. When a guard 90 is used, it further defines cavity 46 which is bounded by an outside surface 94 of guard 90, inner surface 40 of cylindrical member 36, the lower boundary 28 and the upper boundary surface 10. As can be seen in FIG. 1, the housing bounded by guard 90 encloses the pump 22 and various cartridge heaters 18. Guard 90 includes a first seal 96 at a first edge 98 of the guard adjacent the lower boundary 28 and a second seal 100 at a second edge 102 of the guard adjacent the upper boundary surface 10. Seals 96 and 100 can be, for example, an elastomer such as, for example, a known silicone sealing material. As is the case regarding the tubular standoffs 86, in order to adequately provide for deflection of top plate 24, the first edge 98 is spaced further from lower boundary 28 than is the inner shoulder 84 before the draw members are pre-loaded. The first edge 98 is spaced nearer to lower boundary 28 than are ends 88 of the draw members 86 before the draw members are pre-loaded. However, the edge 98 engages lower boundary 28 when the draw members have been pre-loaded, as depicted in phantom lines 24' in FIG. 2.

In the preferred embodiment, the first bottom portion 62 of bottom plate 8 includes a plurality of fins 104. Preferably, as noted above, bottom plate 8 is a single piece of aluminum, and in such an embodiment fins 104 have been machined into such single piece of material to provide a unitary, finned bottom plate 8.

In operation, the bottom plate 8 is heated by means of cartridge heaters 18 and the follower plate assembly 2 is lowered in a known manner into a container 4 of material to be melted and dispensed. The temperature of the bottom plate 8 will be as high as 500 degrees F., or even higher, and the pressure exerted by the bottom plate against the material in container 4 will be as high as 100 pounds per square inch, or even higher. Such high temperature will substantially reduce the viscosity of the material to be dispensed, and the combination of high temperature and pressure will cause such material to become free flowing. During operation of the follower plate assembly 2 there will be a tendency for the free flowing melted material to seek to flow into cavity 46 at the interface between the lowermost portion of the upper boundary surface 10 at the peripheral flange 70 of bottom plate 8 and the lower surface 44 of the cylindrical member 36. However, the lower surface 44 is caused to bear against the upper slip ring 54 of the plurality of stacked slip rings 54, 56 and 58 to close off such interface to the flow of the hot melt material. For example, lower surface 44 can be caused to bear against the upper slip ring 54 at pressures as high as 3000 pounds per square inch, or even higher. In this manner, the hot melt material is subjected to high temperatures and pressures without substantial leakage of the melted material and oxygen at such interface. The wipers 50 prevent leakage of the melted material and oxygen an the interface of inside surface 6 of container 4 and the outer surface 38 of the cylindrical member 36. In this manner, the melted material is caused to flow, in a known manner, through the spaces which separate fins 104 and along flow channels to aperture 14 for dispensing as desired. In particular the material flows along paths identified at arrows 20, such flow being further facilitated by means of pump 22.

Figure 4:
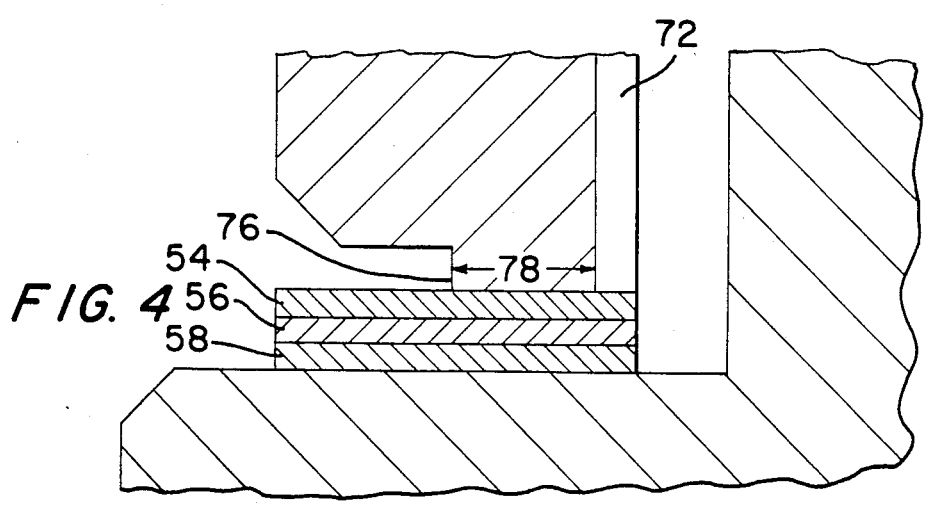
FIG. 4 is an enlarged view of a portion of the follower plate assembly of FIG. 2.

During the melting process there is a tendency for a certain degree of heat transfer between the heated bottom plate 8 and the cylindrical member 36. The transfer of such heat is limited, however, due to the presence of the insulating gaskets 72. For example, as bottom plate 8 expands it engages the gaskets 72 rather than the inner surface 40 of the cylindrical member 36. In addition, the width of the peripheral flange 76 is limited to reduce the area allowable for the direct transfer of heat from the heated bottom plate. By so limiting contact between the bottom plate 8 and cylindrical member 36, the increase in temperature of the bottom plate 8 does not damage the resilient wipers 50 attached to cylindrical member 36 even though it has been found that there is adequate heat transfer to heat such wipers to the degree required to prevent the melted material from solidifying in the vicinity of the wipers during the dispensing operation. In addition, by so limiting heat transfer to cylindrical member 36, the expansion of the cylindrical member is reduced thereby limiting, if not eliminating, damage to the wipers caused by the container abrading the wipers. Similarly, the container and liner is not damaged, and the follower plate assembly is not bound within the container. It has been observed that notwithstanding the high pressure exerted by the cylindrical member 36 against the bottom plate 8, expansion of the bottom plate relative to the cylindrical member is not impeded since various of the stacked metallic slip rings slide relative to each other in varying degrees to allow for such expansion. In particular, as the bottom plate 8 expands and moves towards the left, as depicted in FIGS. 2 and 4, there is a tendency for slip ring 58 to also move to the left, relative to slip ring 56. In a like manner, slip ring 56 moves to the left, to a less extent than slip ring 58, relative to slip ring 54. When the bottom plate 8 contracts as a result of cooling the bottom plate and the slip rings move to the right back to their original positions. An added advantage of the follower plate assembly described herein is that as the bottom plate 8 expands when heated it bears against gaskets 72 which become compressed and bear against inner surface 40 causing cylindrical member 36 to shift and become properly centered relative to the bottom plate.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

I claim:

1. A follower plate assembly shaped to fit inside a container having an inner wall comprising:
   a bottom plate including an upper boundary surface and a lower boundary surface and having at least one aperture therethrough, said bottom plate including means associated therewith useful in providing for heating said bottom plate when said follower plate assembly is in operation;
   at least one top plate spaced from said bottom plate and having an upper boundary and a lower boundary, said top plate including an outer peripheral portion;
   a cylindrical member having an outer surface, an inner surface, an upper surface, and a lower surface, said cylindrical member being positioned between said bottom plate and said top plate, such that said upper surface is adjacent said lower boundary and said lower surface is adjacent but not in contact with said upper boundary surface, to form a cavity formed by said bottom plate, said top plate, and said cylindrical member, and said cylindrical member including means engaging said outer surface for sealing an interface between said inner wall of said container and said outer surface of said cylindrical member when said follower plate assembly is inserted into said container;
   means engaging said upper surface and said lower boundary to form first means for sealing said cavity at an interface between said cylindrical member and said top plate;
   means positioned between said lower surface and said upper boundary surface to form second means for sealing said cavity at an interface between said cylindrical member and said bottom plate, said second means including a plurality of stacked metallic slip rings including an uppermost slip ring which engages said lower surface and a lowermost slip ring which engages said upper boundary surface; and,
   means engaging said top plate and said bottom plate for urging said top plate towards said bottom plate to actuate said first means and said second means.

2. The follower plate assembly of claim 1 wherein said urging means includes a plurality of draw members extending from said top plate to said bottom plate.

3. The follower plate assembly of claim 2 wherein said draw members are pre-loaded to cause said top plate to be bowed towards said bottom plate, said outer peripheral portion to exert a force against said top surface, and said lower surface to exert a force against said uppermost slip ring.

4. The follower plate assembly of claim 3 wherein said bottom plate includes a first cylindrical portion which includes said lower boundary surface and a second cylindrical portion which includes an uppermost portion of said upper boundary surface, said first cylindrical portion and said second cylindrical portion having relative diametrical dimensions wherein the diametrical dimension of said first cylindrical portion is greater than the diametrical dimension of said second cylindrical portion, said first cylindrical portion thereby forming a first peripheral flange which includes a lowermost portion of said upper boundary surface.

5. The follower plate assembly of claim 4 wherein said lower surface of said cylindrical member is adjacent said first peripheral flange.

6. The follower plate assembly of claim 5 further including at least one insulating gasket positioned between said inner surface and said first portion.

7. The follower plate assembly of claim 6 wherein said lower surface of said cylindrical member includes a second peripheral flange which is adjacent said first peripheral flange at said lowermost portion of said upper boundary surface.

8. The follower plate assembly of claim 7 wherein said second peripheral flange is sized to minimize heat transfer from said bottom plate to said cylindrical member.

9. The follower plate assembly of claim 8 further including a plurality of tubular standoffs extending from said lower boundary to said upper boundary surface, each tubular standoff of said plurality of tubular standoffs having inserted therethrough a respective draw member of said plurality of draw members.

10. The follower plate assembly of claim 9 wherein said upper surface of said cylindrical member includes a peripheral groove having an outer shoulder and an inner shoulder, said outer shoulder engaging said lower boundary and said inner shoulder being spaced from said lower boundary before said plurality of draw members are pre-loaded, and said outer shoulder and said inner shoulder engaging said lower boundary when said plurality of draw members have been pre-loaded, and wherein said first means includes a resilient sealing member positioned in said peripheral groove.

11. The follower plate assembly of claim 10 wherein one end of each tubular standoff, of said plurality of tubular standoffs, nearest said lower boundary is spaced further from said lower boundary than is said inner shoulder before said plurality of draw members are pre-loaded, said one end engaging said lower boundary when said plurality of draw members have been pre-loaded.

12. The follower plate assembly of claim 11 further including a guard spaced from said inner surface of said cylindrical member and extending from said upper boundary surface to said lower boundary, said guard extending about said top plate and said bottom plate to form a housing, bounded by an inside surface of said guard, said lower boundary and said upper boundary surface, and to form said cavity bounded by an outside surface of said guard, said inner surface, said lower boundary and said upper boundary surface.

13. The follower plate assembly of claim 12 further including a first seal at a first edge of said guard adjacent said lower boundary, and a second seal at a second edge of said guard adjacent said upper boundary surface.

14. The follower plate assembly of claim 13 wherein said first edge is spaced further from said lower boundary than is said inner shoulder, and is spaced nearer to said lower boundary than is said one end, before said plurality of draw members are pre-loaded, said first edge engaging said lower boundary when said plurality of draw members have been pre-loaded.

15. The follower plate assembly of claim 14 wherein said first portion of said bottom plate includes a plurality of fins.

16. The follower plate assembly of claim 15 wherein said bottom plate is a single piece of aluminum.

17. The follower plate assembly of claim 16 wherein said engaging means includes at least one channel extending about said outer surface of said cylindrical member and including a resilient sealing member positioned within said at least one channel for engagement with said inner wall.

* * * * *